US007568825B2

(12) United States Patent
Louvet et al.

(10) Patent No.: US 7,568,825 B2
(45) Date of Patent: Aug. 4, 2009

(54) HEADLIGHT FOR MOTOR VEHICLES

(75) Inventors: Nicolas Louvet, Paris (FR); Alexandre Mensales, Montmagny (FR)

(73) Assignee: Valeo Vision, Bobigny (FR)

( * ) Notice: Subject to any disclaimer, the term of this patent is extended or adjusted under 35 U.S.C. 154(b) by 161 days.

(21) Appl. No.: 11/673,633

(22) Filed: Feb. 12, 2007

(65) Prior Publication Data

US 2008/0180966 A1 Jul. 31, 2008

(30) Foreign Application Priority Data

Feb. 14, 2006 (FR) .................................. 06 01296

(51) Int. Cl.
*B60Q 1/00* (2006.01)

(52) U.S. Cl. ........................ 362/539; 362/507; 362/513

(58) Field of Classification Search ................. 362/539, 362/512, 513, 520, 538, 284, 507, 282, 277, 362/280, 319, 324, 323, 467, 468, 322
See application file for complete search history.

(56) References Cited

U.S. PATENT DOCUMENTS 1,389,291 A * 8/1921 Bone .......................... 362/280
1,658,679 A * 2/1928 Hill et al. .................... 362/284
1,834,542 A * 12/1931 Birger ........................ 362/281
4,785,382 A * 11/1988 Fukura et al. ............... 362/527
4,991,063 A * 2/1991 Stoneham .................... 362/18
5,190,368 A * 3/1993 Sekiguchi ................... 362/539
5,339,226 A 8/1994 Ishikawa
5,422,623 A * 6/1995 Bader et al. ................. 340/331
5,899,559 A * 5/1999 Lachmayer et al. .......... 362/513
6,116,764 A * 9/2000 Eichhorn et al. ............ 362/512
6,425,683 B1 * 7/2002 Kusagaya et al. ........... 362/512
6,607,295 B2 * 8/2003 Hayakawa .................. 362/517
6,623,149 B2 * 9/2003 Leleve ........................ 362/512
6,796,696 B2 * 9/2004 Taniuchi ..................... 362/539
7,140,759 B1 * 11/2006 Tsai et al. ................... 362/539
7,201,505 B2 * 4/2007 Sugimoto et al. ........... 362/539
7,284,888 B2 * 10/2007 Pauty et al. ................. 362/539
2004/0228137 A1 11/2004 Mensales et al.
2005/0180154 A1 * 8/2005 Albou et al. ................ 362/514

FOREIGN PATENT DOCUMENTS

| | | |
|---|---|---|
| DE | 103 34 553 | 6/2005 |
| EP | 0 690 261 | 1/1996 |
| FR | 2 769 071 | 4/1999 |
| FR | 2854941 B1 | 11/2004 |
| GB | 2 273 555 | 6/1994 |

* cited by examiner

*Primary Examiner*—Sandra L O'Shea
*Assistant Examiner*—Gunyoung T Lee
(74) *Attorney, Agent, or Firm*—Jacox, Meckstroth & Jenkins

(57) ABSTRACT

A headlight for motor vehicles comprising a light-shield mechanism having at least first and second rotary light shields for producing respectively at least first and second different light beams, wherein the shield mechanism also comprises at least one means of mechanically locating the idle position of the shield mechanism, and an actuator able to make the first and second light shields, turn in two directions of rotation.

20 Claims, 2 Drawing Sheets

HEADLIGHT FOR MOTOR VEHICLES

BACKGROUND OF THE INVENTION

1. Field of the Invention

The invention concerns in general terms a headlight for a motor vehicle comprising a light shield mechanism having at least two rotary light shields for producing respectively two different light beams. More particularly, the invention concerns a dual-function headlight capable of producing dipped/low beams and main light beams for both left-hand and right-hand traffic modes.

2. Description of the Related Art

A dual-function headlight comprising two rotary light shields is known from the inventive entity. The light shields make it possible to obtain a cutoff, so as to obtain, notably, dipped/low beam light beam for right-hand traffic and left-hand traffic modes. The rotation of the shields and their angular positioning are obtained by means of a control by stepping motor. This solution of control by stepping motor has drawbacks.

A stepping motor is an actuator that remains relatively expensive and that requires adapted electronics, capable of generating the various pulsed signals necessary for its control. In addition, the problem of the loss of a step is liable to introduce imprecision in the angular positioning of the shields, which requires the implementation of particular provisions for periodically referencing the angular position of the axis of the stepping motor.

There is, therefore, a need to provide an improved headlight that overcomes one or more of the problems of the prior art.

SUMMARY OF THE INVENTION

The main objective of the invention is to provide a technical alternative to the use of a stepping motor in this type of headlight.

The headlight for motor vehicles according to the invention comprises a light shield mechanism having at least a first rotary light shield and a second rotary light shield for producing respectively at least a first light beam and a second light beam wherein the first and second light beams are different light beams.

In one aspect, the invention concerns a headlight for a motor vehicle comprising a light shield mechanism having at least first and second rotary light shields for producing respectively at least first and second light beams, such that the said shield mechanism also comprises:

- at least one means of mechanical location of the idle position of the shield mechanism; and
- an actuator able to make the first and second light shields turn in two directions of rotation.

The mechanical location means is perfectly chosen from a retractable stop or other mechanical means of the roller, ball, spring or spring bolt type. "Idle position" means the position towards which the shield returns naturally, in particular in the case of failure of its actuation means. This is generally a position in which the beam emitted is a beam with cutoff (in contradistinction to a beam without cutoff of the main beam type).

It should be noted that the term "headlight" used in the context of the present text concerns in fact, unless otherwise specified, the unit optical module able to be integrated subsequently in a complete headlight possessing other modules.

In accordance with the invention, the shield mechanism also comprises, according to one embodiment, at least one first stop determining at least one first angular rotational stop position of the shield, the stop being retractable and able to allow the first angular rotational stop position of the shield to be passed by at least one of the first and second light shields when a lighting mode switching is demanded in the headlight; and an actuator able to make the first and second light shields turn in two rotation directions.

According to another characteristic, the light shield mechanism also comprises elastic machines for bringing and holding a light shield in the first angular rotational stop position when the actuator is inactive.

In a particular embodiment able to provide light beams with cutoff of the dipped type for right-hand and left-hand traffic modes, the light shield mechanism comprises first and second light shields having respective profiles able to produce the light beams with cutoff, like of the low beam/dipped type; and the first retractable stop determines angular positions of the first and second shields for producing light beams with cutoff.

Preferably, the light shield mechanism also comprises at least one second stop of the fixed type determining at least one second angular rotational stop position of the shield for producing a light beam of the main beam type.

According to another characteristic, the light shield mechanism comprises two second stops of the fixed type situated on each side of the retractable stop with predetermined angular offsets and preferably symmetrically, and each second stop of the fixed type determines a second respective angular rotational stop position for each of the first and second shields, for producing a light beam of the main beam type.

According to one particular embodiment, the retractable stop is elastic and flexes to enable the first angular position for a light shield to be passed when a mechanical torque greater than a maximum threshold torque is applied against the retractable stop. In addition, the actuator comprises a DC motor and an electronic control circuit able to control the motor in two directions of rotation. The electronic control circuit is advantageously equipped with electric current limitation means for limiting an electric current flowing in the motor when the latter is in a locked torque operating state.

According to another aspect, the invention also concerns a motor vehicle equipped with at least one headlight (the unit optical module or complete headlight) according to the invention.

According to embodiments of an optical module according to the invention the first and second beams with cutoff obtained with the shield mechanism are

- variant a: dipped/low beam beams for right-hand and left-hand traffics
- variant b: dipped/low beam (either right-hand traffic or left-hand traffic), and a beam in accordance with the new so-called AFS "Advanced Frontlighting Systems" regulations. This "AFS" beam is in particular chosen from the beam called a motorway beam ("motorway" in English), or a bad-weather beam ("adverse weather" in English), Those beams having in common notably the fact that they have a cut off.
- Variant c: a dipped/low beam (or AFS beam) and a beam with flat cutoff, like of the anti fog type.

For each of these variants, a third beam of the main beam type is also proposed, so as to obtain a triple-function optical module, which will correspond to a position of the shield mechanism such that it does not obscure the rays emitted by the source directly or after reflection on the associated reflector.

Other aspects and advantages of the present invention will emerge more clearly from a reading of the description of a particular embodiment that follows, this description being given by way of non-limiting example and made with reference to the accompanying drawings, in which:

DETAILED DESCRIPTION OF THE PREFERRED EMBODIMENTS

Figure 1A:
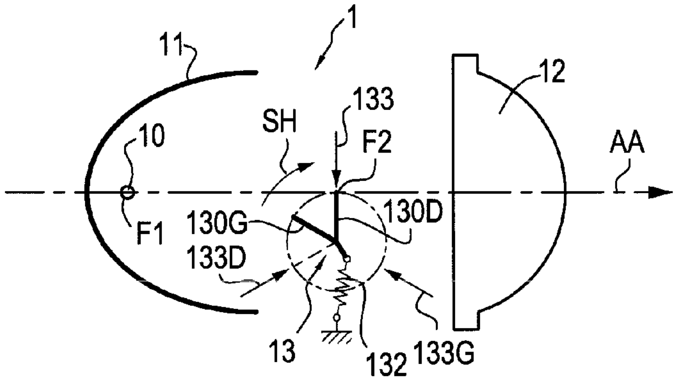
FIGS. 1A to 1D show in a simplified fashion the general structure of a headlight according to the invention in various states of operation.
Figure 1B:
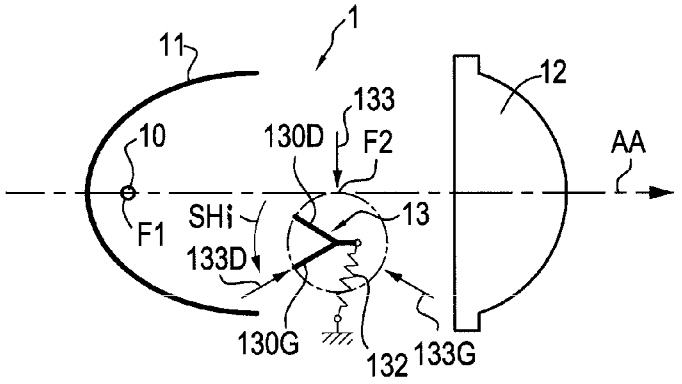
Figure 2:
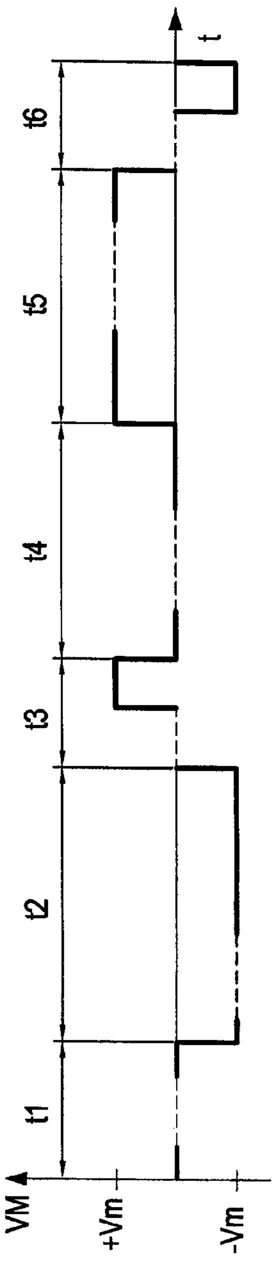
FIG. 2 is an outline timing diagram of the control of a DC motor included in a shield mechanism of the headlight.

With reference to FIGS. 1A to 1B and 2, a description is now given of a particular embodiment of the invention in the form of a dual-function dipped/main beam headlight, referenced overall 1, able to switch automatically between a right-hand traffic mode and a left-hand traffic mode.

The headlight 1 described here is intentionally shown in a simplified manner in FIGS. 1A to 1B in order to facilitate understanding of the invention.

The headlight 1 is of the elliptical type and is designed so as to emit a beam of illuminating light along an optical axis AA passing through foci F1 and F2. The headlight 1 comprises essentially a light source 10 situated at a focus F1 of the headlight 1, an elliptical reflector 11, a lens 12 and a light shield mechanism 13.

The light source 10, the reflector 11 and the lens 12 are known elements, similar to those normally included in such a headlight for a motor vehicle. For this reason, these elements 10, 11 and 12 will not be detailed here.

The shield mechanism 13 is situated substantially at the focus F2 of the headlight 1.

Figure 3A:
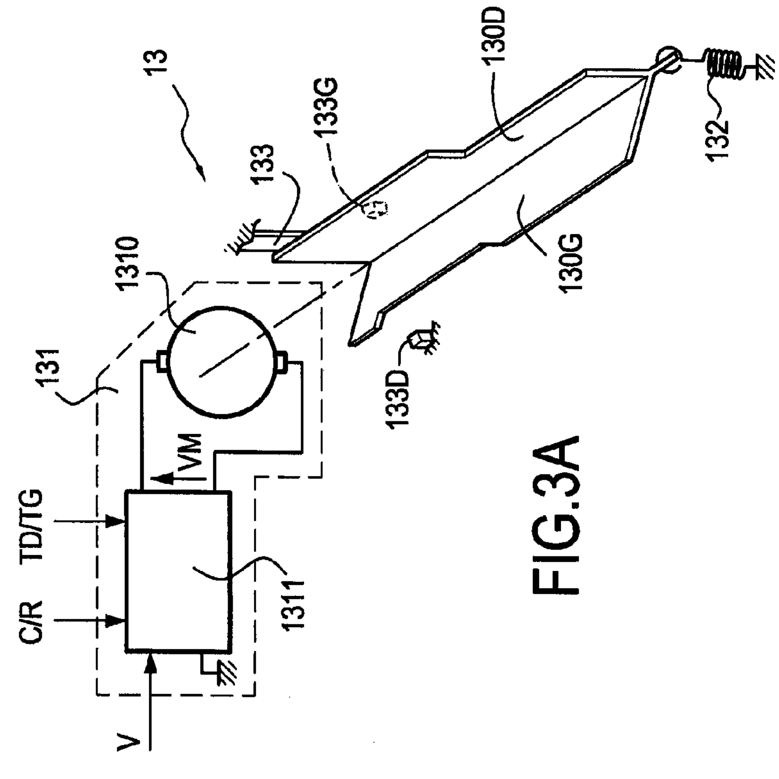
FIGS. 3A and 3B show the shield mechanism in two states corresponding respectively to the production of a dipped beam for traffic on the right and a dipped beam for traffic on the left.
Figure 3B:
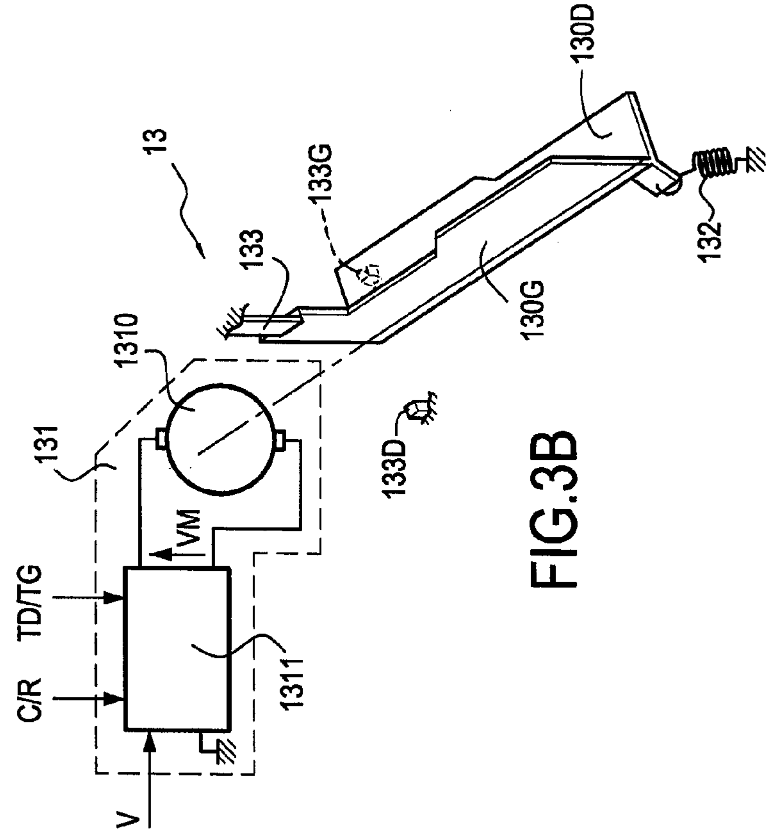

As shown in more detail in FIGS. 3A and 3B, the shield mechanism 13 comprises essentially two shields 130D and 130G formed in a single piece 130, an actuator with motor 131, a return spring 132 and three stops 133, 133D and 133G. In this particular embodiment, the stops 133D and 133G are situated on each side of the stop 133, with given angular offsets, preferably symmetrically.

The shield 130D is provided with a profile suitable for introducing a cutoff of the dipped beam type in the traffic on the right mode TD. The shield 130G for its part is provided with a profile able to introduce a cutoff of the dipped beam type in the traffic on the left mode TG.

The actuator with motor 131 controls rotations of the shield piece 130 about an axis PP (FIG. 3B) perpendicular to the optical axis AA (FIG. 1) of the headlight 1.

The actuator with motor 131 comprises essentially an electric motor 1310 and an electronic control circuit 1311. The motor 1310 is preferably a DC motor. The electronic circuit 1311 controls the functioning of the motor 1310 according to two input signals, namely a dipped/main beam mode control signal C/R and a signal controlling the traffic on the right/traffic on the left mode TD/TG.

The circuit 1311 is supplied with a DC voltage V and delivers as an output a control voltage VM whose polarity is variable so as to control the direction of rotation of the motor 1310.

The functions of the stops 133, 133D and 133G and the functioning of the actuator with motor 131 will now be described in more detail.

FIGS. 1A, 1B and 3A show the headlight 1 in states corresponding to the traffic on the right mode TD.

In FIGS. 1A and 3A, the headlight 1 is in the dipped beam lighting mode, in TD traffic. This state corresponds to the time interval t1 shown in FIG. 2. The control voltage VM is at 0 volts and the motor 1310 then exerts no rotation torque on the shield piece 130. A return torque CR is on the other hand exerted by the spring 132 in the clockwise rotation direction SH so that the shield 130D is held in abutment against the stop 133.

In accordance with the invention, the stop 133 is of the retractable type. In this particular embodiment, a property of elasticity is conferred on the stop 133 so as to make it retractable. Naturally the function of the stop 133 can be fulfilled in a different way by a person skilled in the art. For example, it can be in the form of a sliding stop actuated by an electromagnet.

In this particular embodiment, the stop 133 no longer fulfils its function of rotational stopping of the shield piece 130 when the torque Cc applied to the shield piece 130 is greater than a maximum threshold torque Cm of given value. Thus, when the torque Cc applied to the shield piece 130 is greater than Cm, the mechanical force applied to the stop 133 by the shield 130D or 130G in abutment against it makes the stop 133 flex by elasticity. The flexion of the stop 133 is then sufficient to release the shield piece 130 and allow continuation of the rotation thereof after the stop 133 has been passed.

In the state corresponding to FIG. 1A, the return torque Cr due to the spring 132 is less than the maximum threshold torque Cm and the stop 133 then fully fulfils its function of rotational stoppage of the shield 130, by contact of the shield 130D against it (cf FIG. 3A).

FIG. 1B shows the headlight 1 in main-beam lighting mode, still in TD traffic. This state corresponds to the time interval t2 shown in FIG. 2.

The control voltage VM then has a value −Vm able to produce a rotation torque of the motor 1310 in the anticlockwise rotation direction Shi. When the shield 130G comes into contact against the stop 133D, the rotation of the shield piece 130 is interrupted. The voltage VM=−Vm is maintained so as to oppose the return torque Cr exerted by the spring 132 and to keep the shield piece 130 in the state shown in FIG. 1B.

In this particular embodiment of the invention, in order to avoid damage to the motor 1310 when the latter is in a locked torque state, a limitation of the current supply to the motor is provided. The locked torque state occurs when the shield piece 130 comes into contact against the stop 133D in TD traffic mode or the stop 133G in TG traffic mode.

This limitation of the current of the motor 1310 is provided by the control circuit 1311. A person skilled in the art will usefully refer to the patent application FR-2854941B, corresponding to U.S. Patent Application Publication Number 2004/0228137 which is incorporated herein by reference and made a part hereof, of the applicant in order to obtain details on the manner of achieving such a limitation of the current of the motor 1310.

With reference to FIG. 2, the time interval t3 corresponds to the switching of the headlight 1 to traffic on the left mode TG.

Figure 1C:
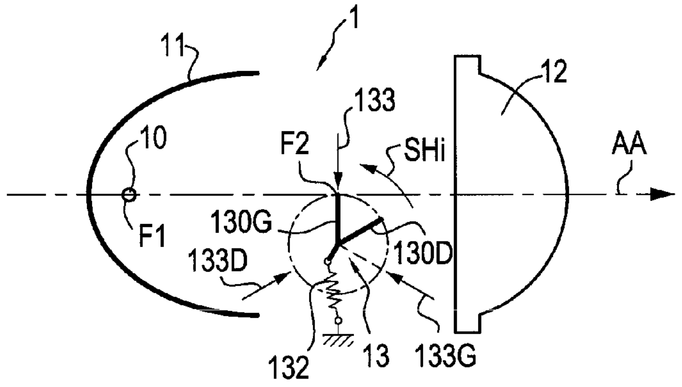

During the time interval t3, the control voltage VM is reversed in polarity and becomes VM=+Vm. The motor 1310 then supplies a mechanical torque in the clockwise rotation direction SH that is added to the torque Cr exerted by the spring. The torque Cc applied to the shield piece 130 then takes a value that is greater than the torque Cm so that the retractable stop 133 flexes sufficiently and no longer forms an obstacle to the rotation of the shield piece 130, which comes into the state shown in FIG. 1C. Naturally, to have correct functioning of this switching to TG traffic mode, the voltage VM must keep the value +Vm for a sufficient period to enable the stop 133 to be passed by the two shields 130D and 130G, as shown in FIG. 1C. After the stop 133 is passed by the shield 130G, the voltage VM can be returned to 0 volts in order to come into the TG traffic dipped lighting mode or maintained at +Vm in order to come into TG traffic main-beam lighting mode.

In FIGS. 1C and 3B, the headlight 1 is shown in dipped lighting mode in TG traffic. This state corresponds to the time interval t4 shown in FIG. 2. The control voltage VM is at 0 volts and the motor 1310 then exerts no rotation torque on the shield piece 130. The return torque Cr is on the other hand exerted by the spring 132 in the anticlockwise rotation direction SHi so that the shield 130G is kept in abutment against the stop 133, or more precisely against a contact face of the stop 133 that is opposite to that serving as an abutment for the shield 130D in TD traffic mode The stop 133 here operates in the same way as described above in relation to the TD traffic mode and can be retracted also for switching from TG traffic mode to TD traffic mode.

In the state corresponding to FIG. 1C, the return torque Cr due to the spring 132 is therefore less than the maximum threshold torque Cm and the stop 133 fully fulfils its function of rotational stoppage of the shield piece 130 by contact of the shield 130G against the stop 133 (cf FIG. 3B).

Figure 1D:
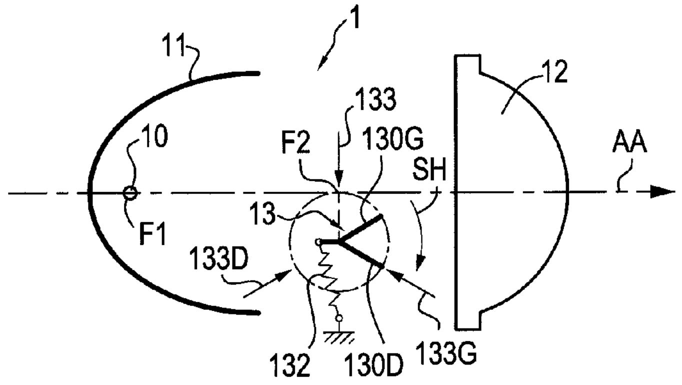

FIG. 1D shows the headlight 1 in main-beam lighting mode, still in TG traffic. This state corresponds to the time interval t5 shown in FIG. 2. The control voltage VM then has a value +Vm shown in FIG. 2.

The control voltage VM then has a value +Vm able to produce a rotation torque of the motor 1310 in the clockwise rotation direction SH. When the shield 130D comes into contact against the stop 133G, the rotation of the shield piece 130 is interrupted. The voltage VM=+Vm is maintained so as to oppose the return torque Cr exerted by the spring 132 and to keep the shield piece 130 in the state shown in FIG. 1D. The limitation of the current of the motor 1310 is here also provided in order to prevent damage to it in locked torque.

The time interval t6 shown in FIG. 2 corresponds to the switching of the headlight 1 to traffic on the right mode TD, in order to return to the state of the time interval t1 or t2. The functioning of this switching is similar to that described above for passage from TD mode to TG mode and will not be detailed here.

As appears clearly in the light of the above description of this first embodiment of the invention the stops 133, 133D and 133G determine various angular positions of rotational stoppage of the shields.

The retractable stop 133 with its opposing contact faces determine two angular positions, a first one for the shield 130D and another for the shield 130D, these angular positions corresponding to TD traffic mode dipped lighting and TG traffic mode dipped lighting.

The fixed stops 133D and 133G determine two angular main-beam lighting positions for the shields 130D and 130G, one for TD traffic mode and the other for TG traffic mode.

Naturally the present invention is not limited to the details of the particular embodiment described here by way of example, but on the contrary, extends to any modifications within the capability of a person skilled in the art without departing from the scope of the invention.

Thus a person skilled in the art may not use a DC motor for the rotation of the shield piece 130 but use for example other types of actuator such as a stepping motor or an electromagnet. In the case of the use of a stepping motor, the presence of stops in accordance with the invention will afford greater robustness of the angular positioning of the shield piece, for example by allowing a referencing in the event of loss of step.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A headlight for a motor vehicle comprising a light shield mechanism having at least one of a first and second rotary light shields for producing respectively different first and second light beams, wherein said light shield mechanism also comprises:

at least one first stop determining at least one first angular rotational stop position for said at least one of said first or second rotary light shields, said at least one of a first stop being retractable so that said first angular rotational stop position of said shield is passed by at least one of said first and second rotary light shields when a lighting mode switching is demanded in the headlight; and an actuator able to make said first and second rotary light shields turn in two directions of rotation.

2. A headlight comprising a light shield mechanism having at least one of a first and a second light shield for producing, respectively, at least one of a first and a second different light beam, wherein said light shield mechanism also comprises:

at least one means of mechanical location of the idle position of said light shield mechanism, and an actuator making said first and second light shields turn in two directions of rotation;

said headlight comprising at least one first stop determining at least one first angular rotational stop position of said light shield mechanism, said at least one first stop being retractable and able to enable said at least one first angular rotational stop position of said light shield mechanism to be passed by at least one of said first and second light shields when a switching of lighting mode is demanded in the headlight.

3. A vehicle headlight comprising:

a light source for emitting a light beam having an optical axis;

a light shield having a first light shield and a second light shield, said first and second light shields being situated in a path of said light beam for providing a first light beam and a second light beam, respectively;

at least one stop; and an actuator for rotatably driving said light shield;

said actuator rotatably driving said light shield about a horizontal axis until said first light shield or said second light shield engages said at least one stop in order to provide said first light beam or said second light beam, respectively; wherein said at least one stop is passed by at least one of said first and second light shields when a mechanical torque greater than a maximum threshold torque is applied against said at least one stop; and wherein said actuator drives said light shield about said horizontal axis so that only one of said first light shield and said second light shield is optically active and situated in said light beam to provide a first dipped-beam cut-off and a second dipped-beam cut-off, respectively, of light exiting said vehicle headlight, said light shield is rotated to provide said first dipped-beam cut-off, said second light shield is not in a oath of said optical axis and when said light shield is rotated to provide said second dipped-beam cut-off, said first light shield is not in a oath of said optical axis.

4. The vehicle headlight as recited in claim 3 wherein said at least one stop is a resilient stop that yields to said first light shield or said second light shield as said light shield is driven by said actuator.

5. The vehicle headlight as recited in claim 3 wherein said at least one stop is a retractable stop that is driven away from a path of said first light shield or said second light shield to provide said first light beam or said second light beam.

6. The vehicle headlight as recited in claim 3 wherein said vehicle headlight further comprises an elastic means for biasing said light shield in a home position.

7. The vehicle headlight as recited in claim 6 wherein said elastic means is a spring.

8. The vehicle headlight as recited in claim 3 wherein said first light shield comprises a first profile and said second light shield comprises a second profile for providing said first and second light beams, respectively, wherein said first and second light profiles are different.

9. The vehicle headlight as recited in claim 3 wherein said light shield is adapted to cause said light shield to provide said first light beam associated with said first profile, said second light beam associated with said second profile, and a third light beam, wherein said first and second light beams are dipped with said cut-off and said third light beam is a main beam without cut-off.

10. A motor vehicle headlight comprising: a light source for generating a light beam along an optical axis; a light shield mechanism situated in operative relationship with said light source having at least first and second rotary light shields for cooperating with said light beam to provide, respectively, at least first and second different light beams, wherein the light shield mechanism also comprises:

at least one means of first stop mechanical location of the idle position of the light shield mechanism, wherein said at least one first stop mechanical location is retractable stop, said retractable stop is elastic and flexes to enable said angular idle position to be passed by at least one of said first and second rotary light shields when a mechanical torque greater than a maximum threshold torque is applied against said retractable stop, and an actuator making said first and second light shields turn in two directions of rotation;

said actuator rotatably driving said first and second light shields about a horizontal axis, such that only one of said first or second light shields is situated in said light beam to produce said first and second different light beams, respectively.

11. The headlight according to claim 10, wherein said light shield mechanism also comprises elastic means for bringing and holding one of said light shields in said first angular rotational stop position when said actuator is inactive.

12. The headlight according to claim 10, said headlight providing light beams with cut-off for right-hand traffic and left-hand traffic modes, wherein:

said first and second light shields have respective profiles that produce said light beams with cut-off; and said at least one first stop determines angular positions of said first and second light shields for producing said light beams with cut-off.

13. The headlight according to claim 10, wherein said first and second light shields have respective profiles that produce, respectively, a first beam with dipped/low beam cut-off and a second beam with a different cut-off, for example of the motorway dipped or anti-fog type.

14. The headlight according to claim 10, wherein said first and second light shields have respective profiles that produce, respectively, a first beam with right-hand traffic cut off and a second beam with left-hand traffic cut-off.

15. The headlight according to claim 10, wherein said light shield mechanism provides a third light beam without cut-off, for example, of the main beam type.

16. The headlight according to claim 10, said headlight providing a light beam of the main beam type, wherein said light shield mechanism also comprises at least one stop of the fixed type determining at least one second angular rotational stop position for a shield for producing a light beam of the main beam type.

17. The headlight according to claim 16, comprising two second stops of the fixed type situated on each side of said at least one stop with predetermined angular offsets and preferably symmetrically, wherein each second stop of the fixed type determines a second respective angular rotational stop position for each of said first and second light shields, for producing a light beam of the main beam type.

18. The headlight according to claim 1, wherein said actuator comprises a direct current motor and an electronic control circuit that controls said motor in two directions of rotation.

19. The headlight according to claim 18, wherein said electronic control circuit comprises electric current limitation means for limiting an electric current in said direct current motor when the latter is in a locked torque operating state.

20. The headlight according to claim 1, which comprises a reflector of the elliptical type.

* * * * *